(12) United States Patent
Wang

(10) Patent No.: US 7,243,900 B2
(45) Date of Patent: Jul. 17, 2007

(54) BALL VALVE

(75) Inventor: Xizhong Wang, Chengguan Town, Xinchang County (CN)

(73) Assignee: Zhejiang Sanhua Co., Ltd., Zhejiang Province (CN)

( * ) Notice: Subject to any disclaimer, the term of this patent is extended or adjusted under 35 U.S.C. 154(b) by 0 days.

(21) Appl. No.: 11/131,188

(22) Filed: May 18, 2005

(65) Prior Publication Data

US 2005/0258386 A1  Nov. 24, 2005

(30) Foreign Application Priority Data

May 19, 2004  (CN) .................. 2004 2 0022990 U

(51) Int. Cl.
*F16K 25/00* (2006.01)
(52) U.S. Cl. ................. 251/174; 251/180; 267/162
(58) Field of Classification Search ............. 251/174, 251/180, 192, 315.01; 267/162, 161
See application file for complete search history.

(56) References Cited

U.S. PATENT DOCUMENTS

| | | | | |
|---|---|---|---|---|
| 3,830,693 A * | 8/1974 | Beser et al. | ........ | 251/174 |
| 4,566,482 A * | 1/1986 | Stunkard | ........ | 251/174 |
| 4,718,444 A * | 1/1988 | Boelte | ........ | 251/174 |
| 4,744,572 A * | 5/1988 | Sahba et al. | ........ | 251/174 |
| 5,857,663 A * | 1/1999 | Evans et al. | ........ | 251/174 |
| 5,868,378 A * | 2/1999 | McMahon et al. | ..... | 251/315.08 |
| 6,193,213 B1 * | 2/2001 | Stearns et al. | ........ | 251/180 |
| 6,488,261 B1 * | 12/2002 | Lee | ........ | 251/180 |
| 6,499,720 B1 * | 12/2002 | Lee | ........ | 251/174 |

* cited by examiner

*Primary Examiner*—John Bastianelli
(74) *Attorney, Agent, or Firm*—Birch, Stewart, Kolasch & Birch, LLP

(57) ABSTRACT

A ball valve for refrigerating system includes a valve body, a valve seat that fits into the valve body by a screw thread, a valve ball accommodated within the valve body, two plastic sealing elements on both sides of the valve ball, a valve rod connected to the valve ball, and a valve cap on said valve rod. One of the two sealing elements is a first sealing element which is provided with a suitable spring assembly on its periphery. The spring assembly includes at least two springs with ladder-shaped longitudinal sections that are reverse-superimposed. The inside of first sealing element fits well with the surface of said valve ball, while its outside functions as a supporting surface and an acting surface for said spring assembly. The resulting configuration provides a ball valve with a desirable sealing effect.

1 Claim, 2 Drawing Sheets

BALL VALVE

BACKGROUND OF THE INVENTION

1. Field of Invention

This invention relates to a ball valve for refrigerating system.

2. Description of the Related Art

It is known to use ball valves for connecting, intercepting or regulating a cold medium in split refrigerating systems. Generally ball valves (see FIG. 1) have PTFE plastic sealing gaskets on both sides of the valve ball. By screwing in the valve seat along the thread on one side of the valve body, under certain compression, the interactive valve ball and sealing gaskets within the valve body cling to each other closely, and thus function as seal. A valve rod with an "O" ring is connected to the valve ball, so as to open or close the ball valve conveniently by turning the valve rod which drives the valve ball turn. However, due to obvious compression creep of the PTFE plastic sealing gaskets, this kind of ball valve suffers from great permanent compression deformation under high temperature and pressure, thus causing the decreasing of sealing impacting force between the interactive valve ball and PTFE plastic sealing gaskets. The sealing effect is not ideal.

SUMMARY OF THE INVENTION

The invention provides a durable ball valve with desired sealing effect under varying temperature conditions to overcome shortcomings of conventional technology.

The technical solution of the invention is the following.

A ball valve, comprising a valve body, a valve seat that attaches to said valve body by a screw thread, a valve ball accommodated within said valve body, two plastic sealing elements on both sides of said valve ball, a valve rod connected to said valve ball, and a valve cap covered on said valve rod, wherein at least one of said plastic sealing elements is a first sealing element on which suitable spring assembly is configured. The spring assembly consists of at least two springs with ladder-shaped longitudinal section which are reverse-superimposed. The inside of said first sealing element fits against the surface of said valve ball, while its outside functions as a supporting surface and an acting surface for said spring assembly.

The sealing is accomplished by meshing valve seat with the screw thread on one side of the valve body, screwing tightly by a certain torque to compress the spring assembly, and tightening contact of valve ball with plastic sealing elements on both sides of the vale ball through an axial spring force of the spring assembly. In this way, spring assembly provides a continuous pushing force against the plastic sealing elements, thus eliminating the interior leakage caused by the deformation of plastic sealing elements under varying temperature conditions. The spring of the spring assembly is provided to ensure a better sealing of the plastic sealing elements. When a single spring is used, it fails to function because its stiffness makes itself compressed less than the deformation of the plastic sealing elements. When three or more springs are used, manufacturing cost will increase. Therefore, the best solution is to use two superimposed springs.

Said ball valve has one ring metal gasket on each end of the spring assembly to support the spring, and to avoid the generation of copper powder and deformation of valve seat or valve body by preventing the spring from contacting with valve seat or valve body, which is made of copper.

The invention provides ball valves with durable and better sealing by using a continuous pushing force of spring assembly to the plastic sealing elements, and eliminating interior leakage caused by deformation of plastic sealing elements under varying temperature conditions.

The invention is further described with following figures and examples.

DESCRIPTION OF THE PREFERRED EMBODIMENTS

Example 1

Figure 1:
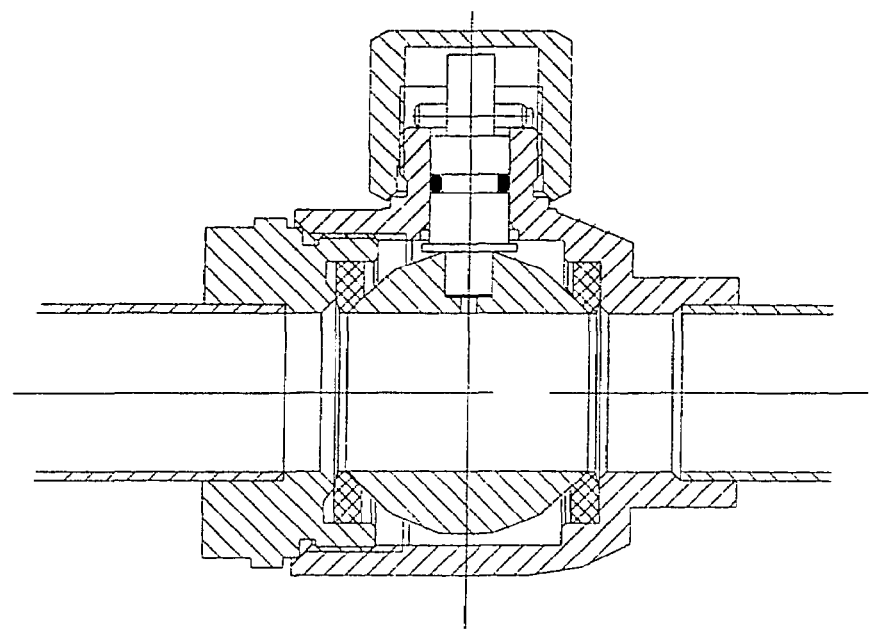
FIG. 1 is a structure drawing of conventional ring valve.
Figure 2:
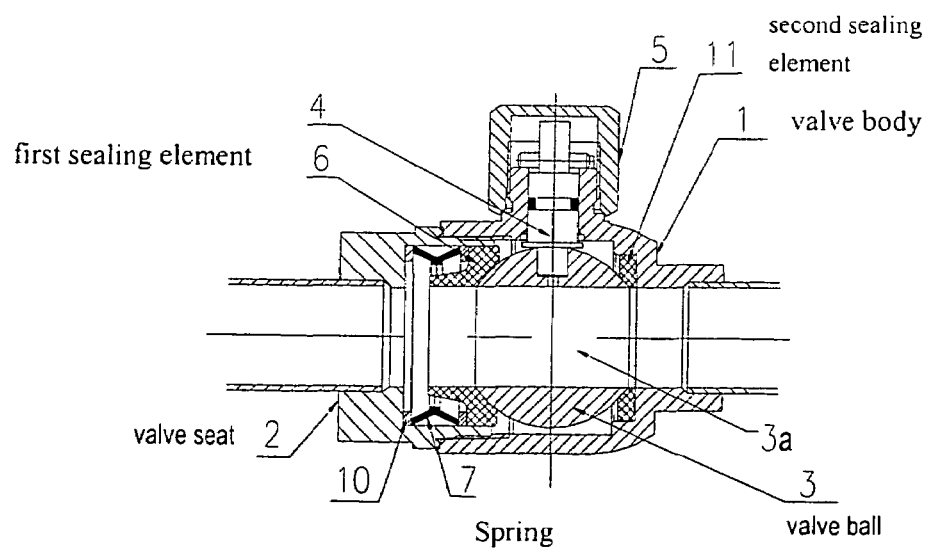
FIG. 2 is a structure drawing of a ball valve embodiment according to the invention.
Figure 3:
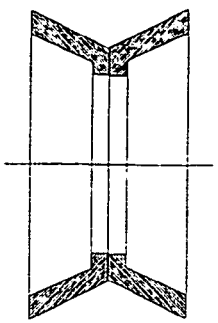
FIG. 3 is a structure drawing of spring assembly embodiment according to the invention.
Figure 4:
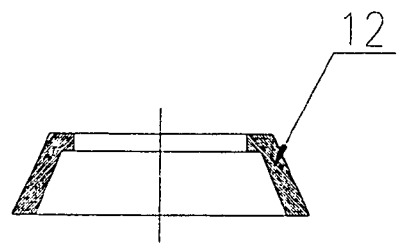
FIG. 4 is a structure drawing of a single spring in FIG. 3.

Referring to FIGS. 2–4, the invention comprises a valve body 1, a valve seat 2 fitted to said valve body 1 by a screw thread, a valve ball 3 accommodated within said valve body 1, a ring plastic sealing element 11 (which is the same as the structure of the conventional sealing element) placed between said valve ball 3 and said valve body 1, a valve rod 4 on said valve ball 3, and a valve cap 5 covering said valve rod 4, and an first plastic sealing element 6 placed between said valve ball 3 and said valve seat 2. The first plastic sealing element 6 is different from (special or abnormal as compared to) the conventional sealing element 11).

Figure 5:
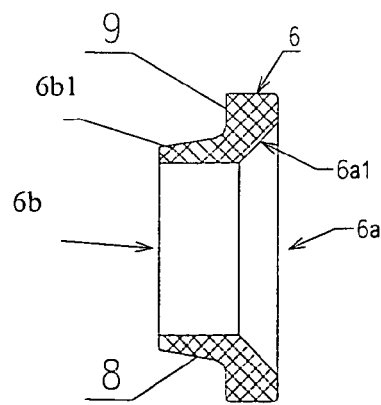
FIG. 5 is a structure drawing of an first sealing element according to the invention.

Referring to FIGS. 2 and 5, the first sealing element 6 is described in further detail. First sealing element 6 includes a supporting surface 8 and an acting surface 9. The supporting surface 8 presents a cone-shaped surface formed by the outside 6b1 of the first sealing element 6 tapering towards the valve seat 2, while the acting surface 9 is formed by extending from the supporting surface 8 in a continuous way and presents a vertical plane relative to the flow line 3a formed by the valve ball 1. The outside 6b1 is disposed on a small-diameter side 6b of said first sealing element 6; while the inside 6a1 is disposed on a large-diameter side 6a on the other side. Such section shape with the left and right sides asymmetrical forms said first sealing element 6.

The inside 6a1 and the surface of the valve ball 3 are in an interference fit by this structure. While the supporting surface 8 supports the spring assembly 7, the elastic forces produced by the spring assembly 7 acts on the acting surface 9.

A suitable spring assembly 7 is configured on said first sealing element 6. The spring assembly 7 consists of springs 12 with ladder-shaped longitudinal section that are reversedly superimposed. The inside 6a1 of said first sealing element 6 fits well with the surface of said valve ball 3, while its outside 6b1 functions both as a supporting surface 8 and an acting surface 9 for said spring assembly 7. Said spring assembly 7 respectively has a ring metal gasket 10 on each end to support said spring assembly 7. There is an "O" ring on said valve rod 4.

Example 2

The difference of this embodiment with that of Example 1 is that the first sealing element 6 and the suitable spring assembly 7 are placed between valve body 1 and valve ball 3, and that a conventional ring plastic sealing element 11 is used between valve seat 2 and valve ball 3.

What is claimed is:

1. A ball valve, comprising:
    a valve body;
    a valve seat attached to said valve body by a screw thread;
    a valve ball accommodated within said valve body;
    first and second plastic sealing elements disposed respectively on opposite sides of said valve ball;
    a valve rod connected to said valve ball; and
    a valve cap on said valve rod,
    wherein said first sealing element is provided with a spring assembly on an outside thereof, the spring assembly including at least two springs with ladder-shaped longitudinal sections which are reverse-superimposed,
    wherein an inside of said first sealing element fits with a surface of said valve ball, while an outside of said first sealing element includes a supporting surface and an acting surface against which said spring assembly presses,
    wherein a periphery of said supporting surface forms an inclined cone-shaped surface in a direction of said valve seat, while said acting surface forms a vertical plane relative to a flow line, and
    wherein said second sealing element is disposed between said valve ball and said valve body,
    said ball valve further comprising:
    one ring metal gasket on each end of said spring assembly in order to support the spring assembly.

* * * * *